Jan. 25, 1949.      H. L. KAHLER      2,460,259
METHOD OF PROTECTING SYSTEMS FOR TRANSPORTING
MEDIA CORROSIVE TO METAL
Filed Jan. 22, 1946

INVENTOR
*Harry Lewis Kahler*
BY
*Harry Ernest Rubens*
ATTORNEY

Patented Jan. 25, 1949

2,460,259

UNITED STATES PATENT OFFICE 2,460,259

METHOD OF PROTECTING SYSTEMS FOR TRANSPORTING MEDIA CORROSIVE TO METAL

Harry Lewis Kahler, Feasterville, Pa., assignor to W. H. and L. D. Betz, Philadelphia, Pa., a firm Application January 22, 1946, Serial No. 642,769

7 Claims. (Cl. 117—97)

My invention relates to a method of protecting the surfaces of pipe lines and apparatus in contact with transported media corrosive to metal.

The corrosive action may be caused by carbon dioxide, oxygen, ammonia, hydrogen sulfide, sulfur dioxide or other substances, in a gaseous, vaporous or liquid state or media, or by the media itself, or both.

Where an attempt has hitherto been made to reduce the corrosive action, such method employed substances which combined chemically with the corrosive elements in the media to reduce the corrosive characteristics. Where expensive substances have been so employed, the cost has been high, and certain by-products may be formed which present problems of disposition.

I have discovered that the most convenient method of protecting the metal surfaces of the system is to provide a film on the contacting surfaces of the transporting system which will prevent the transported media from touching the surfaces, and I, therefore, have as my primary object the formation of such a film.

The efficiency of turbines and other moving apparatus in the systems may be seriously affected by the deposition of a thick film, and my further object is to provide a substantially mono-molecular film which will not materially change the surface characteristics of the metal.

In order that such a film will maintain its corrosion-prevention function, I have determined that such a film should be of the type which would prevent the media from wetting the contacting surfaces of the transporting system. This then is a further object of my invention.

The method of applying the film is important. For example, if the system had to be periodically emptied of the media, while the film is being deposited, such a procedure would be both costly and arduous. Therefore, still another object is to provide a method whereby the film can be deposited while the system is being used.

A corollary to such an object would be to provide a substance which could be added to the media, and in such small quantities that the media would not be materially affected. This would have the added advantage of reducing the cost.

Figure 1:
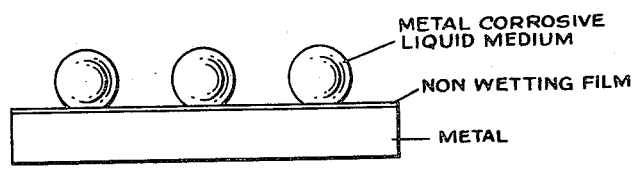
Figure 2:

I accomplish these and other objectives, and obtain my new results as will be apparent from a consideration of the substances and methods of employing them, disclosed in the following specification, particularly pointed out in the attached claims and illustrated in the accompanying drawing in which: Fig. 1 is an enlarged side view of a treated metal specimen indicating the non-wetting characteristics which the treatment has imparted to the metal. The corrosive liquid medium has assumed drop form because of the non-wetting film on the metal. Fig. 2 is a similar view of an untreated metal specimen, but in this case the liquid medium spreads over the metal surface. Whereas in Fig. 2 the corrosive liquid medium has intimate contact with the metal and can thereby corrode it, the metal in Fig. 1 is protected by the non-wetting film which prevents the medium from intimate contact with the metal and thereby prevents corrosion of the metal.

I have discovered that numerous substances may be added in small quantities to media such as corrosive gases, vapors and liquids, without affecting the media in any material manner, to form a thin, substantially monomolecular film on the contacting surfaces of the pipe line and associated equipment preventing the media from corrosively attacking such surfaces. Among the substances that form this non-wetting film are:

GROUP I.—THE HIGH MOLECULAR WEIGHT AMINES (a) Primary amines or their salts having straight carbon chains from $C_{10}$ to $C_{18}$.

Examples

Octadecylamine, $C_{18}H_{37}NH_2$
Hexadecylamine, $C_{16}H_{33}NH_2$
Tetradecylamine, $C_{14}H_{29}NH_2$
Salt: octadecylamine hydrochloride, $C_{18}H_{37}NH_2.HCl$ (b) Secondary amines or their salts having straight carbon chains from $C_{10}$ to $C_{18}$.

Examples

Didodecylamine

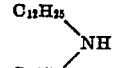

Dioctadecylamine

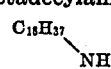

Salt: didodecylamine hydrosulfate

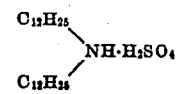

(c) Tertiary amines or their salts having straight carbon chains from $C_{10}$ to $C_{18}$.

Examples

Tridodecylamine, $(C_{12}H_{25})_3N$
Trihexadecylamine, $(C_{16}H_{33})_3N$
Trioctadecylamine, $(C_{18}H_{37})_3N$
Salt: tridodecylamine hydroacetate,
$(C_{12}H_{25})_3N \cdot HC_2H_3O_2$ (d) Unsaturated members of each of a, b and c:

Examples 9-octadecenylamine,
$CH_3(CH_2)_7CH=CH(CH_2)_7CH_2NH_2$
9-12-octadecadienylamine,
$CH_3(CH_2)_4CH=CHCH_2CH=CH(CH_3)_8NH_2$ (e) Isomers Example

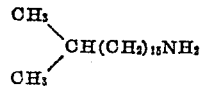

(f) Derivatives

Example $C_{18}H_{36}Cl\, NH_2$ and mixtures of a, b, c, d and e.

GROUP II.—THE LONG CHAIN FATTY ACID PARTIAL ESTERS OF HEXITOL ANHYDRIDES

Examples sorbitan monolaurate
sorbitan monostearate

GROUP III.—AMINE OXIDES CONTAINING STRAIGHT CARBON CHAINS FROM $C_1$ TO $C_{18}$

Examples cetyl dimetyl amine oxide
9-octadecenyl dimethyl amine oxide

Generally the following results were observed from the various experiments:

(a) Film found is substantially monomolecular.
(b) Can select a film forming substance which functions best at a particular pH of the media.
(c) Less film forming substance required as pH increases.
(d) Even 1 P. P. M. of film forming substance gave satisfactory results.
(e) Film forming substance required for media having pH from 3.5 to 10 did not materially change the composition of the media.
(f) Film provides protection over wide range of temperatures.
(g) Steel, brass and other metals protected by film.
(h) Film provided protection, even if metal previously corroded.

The film forming substance may be added directly to the media or by vaporizing the substance and passing the vaporized substance into the media.

In the following static test, low carbon steel specimens having an area of six square inches were immersed in a corrosive media consisting of carbon dioxide, oxygen and water, at a temperature of 180° F.; 200 P. P. M. of film forming substance were introduced into the media; and the specimens were subjected to a one-day exposure.

TABLE 1

| Materials | Loss Of Steel In Milligrams at Different pH Values | | | | | | | |
|---|---|---|---|---|---|---|---|---|
| | 1.0 | 3.5 | 4 | 5 | 6 | 7 | 8 | 10 |
| Loss without treatment (Ave.) | 862 | 210 | 90 | 37 | 36 | 36 | 38 | 32 |
| Octadecylamine acetate | 369 | 100 | 45 | 11 | 1 | 7 | 25 | 25 |
| Hexadecylamine acetate | | | 40 | 20 | 1 | 1 | 3 | 9 | 25 |
| Tetradecylamine acetate | | | 100 | 60 | 30 | 5 | 6 | 8 | 28 |
| Dodecylamine acetate | | | | 150 | 25 | 8 | 11 | 16 | 27 |
| Decylamine acetate | | | | 160 | 48 | 35 | 30 | 27 | 16 |
| Mixture A [1] | | 55 | 35 | 3 | 4 | 9 | 18 | 29 |
| Mixture B [2] | | 70 | 35 | 4 | 4 | 9 | 19 | 13 |
| Dioctadecylamine acetate | | | 35 | 27 | 2 | 9 | 18 | 23 |
| Didodecylamine acetate | | | 85 | 74 | 19 | 5 | 2 | 2 |
| Pitch [3] | | 42 | 25 | 11 | 16 | 19 | 20 | 14 |

[1] 20% hexadecyl, 50% 9-octadecenyl, 30% 9-12 octadecadienyl amine acetates.
[2] 25% octadecyl, 30% hexadecyl, 45% octadecenyl amino acetates.
[3] Amine acetate residues of fatty acids of the cocoanut oil series.

Table 1 shows the effectiveness of many of the substances in reducing the corrosivity of steel. The pure amines were just as effective as the amine salts. The table shows further that different members of these groups work at different pH values, giving more flexibility to this type of treatment in that a choice can be exercised when the pH of the medium demands it. Thus, for example, octadecylamine could be selected for pH range 1-7, and dioctadecylamine for pH 6-7 and didodecylamine for pH 7-10. In Table 1, the use of these filming substances required more treatment as the pH went below 3.5. For pH range 1-3.5 the use of concentrations of not more than 5% is recommended. Above pH 3.5, lower concentrations of not more than 100 P. P. M. were proved to be satisfactory.

In the following test, similar steel specimens were immersed in a corrosive medium consisting of water, carbon dioxide, and oxygen, constantly flowing at a temperature of 160° F. Various amounts of the substance were introduced in the media moving continuously past the specimen for an exposure of two days.

TABLE 2

| Test | Treatment | | Loss of Steel, Mgs. | | Analysis of Medium, P. P. M. | | | Conductivity Micromhos | Per Cent Saving of Steel |
|---|---|---|---|---|---|---|---|---|---|
| | Type | P. P. M. | Specimen 1 | Specimen 2 | pH | $CO_2$ | $O_2$ | | |
| 1 | Control | (¹) | 94 | 83 | 5.0 | 66 | 0.07 | 11 | |
| 2 | Octadecylamine acetate | 154 | 9 | 7 | 5.1 | | 0 | 20 | 91 |
| 3 | Octadecylamine acetate | 25 | 4 | 7 | 4.7 | 94 | 0 | 16 | 93 |
| 4 | Octadecylamine acetate | 5 | .20 | 18 | 4.9 | | 1.5 | 20 | 78 |
| 5 | Octadecylamine acetate | 1 | 37 | 33 | 4.7 | 89 | 0.2 | 20 | 61 |

¹ No treatment.

Table 2 shows that even 1 P. P. M. gave satisfactory results for a moderately acidulated medium in the presence of oxygen. Table 2 also shows that the added treatment did not materially change the composition of the medium.

In the following tests, the conditions were substantially identical to those given in Table 1.

TABLE 3

| Test | Temperature | Temp., °F. | Film Formation |
|---|---|---|---|
| 1 | Octadecylamine | 70 | Good. |
| 2 | Hexadecylamine | 70 | Do. |
| 3 | Tetradecylamine | 70 | Do. |
| 4 | Dodecylamine | 70 | Do. |
| 5 | Dioctadecylamine | 70 | Do. |
| 6 | Didodecylamine | 70 | Do. |
| 7 | 9-Octadecenylamine | 70 | Do. |
| 8 | 9-12 Octadecadienylamine | 70 | Do. |
| 9 | Sorbitan monolaurate | 70 | Fair. |
| 10 | Sorbitan monostearate | 70 | Do. |
| 11 | Cetyl dimethylamine oxide | 70 | Do. |
| 12 | 9-Octadecenyl dimethylamine oxide | 70 | Do. |
| 13 | Octadecylamine | 180 | Good. |
| 14 | Hexadecylamine | 180 | Do. |
| 15 | Dodecylamine | 180 | Fair. |
| 16 | Octadecylamine / Hexadecylamine / Octadecenylamine | 180 | Good. |
| 17 | Sorbitan monolaurate | 180 | Fair. |
| 18 | Octadecylamine | 205 | Good. |

These filming materials provide protection against the corrosivity of media over a wide range of temperature. Table 3 illustrates this point, where good films were obtained over a range of 70 to 205° F.

In the following tests, similar steel specimens were immersed in a corrosive media consisting of water, carbon dioxide and oxygen, constantly flowing at a temperature of 205° F.

TABLE 4

| Test | Treatment Type 1 P. P. M. | Loss of Steel, Mgs. | Per Cent Saving of Steel 2 day basis | Days Exposed |
|---|---|---|---|---|
| 1 | No treatment | ²89 | | 2 |
| 2 | Octadecylamine | 32, 45 | 57 | 2 |
| 3 | No treatment ¹ | 14, 34 | 47 | 1 |

¹ No treatment was supplied but corrosion specimens employed had films from 2 days treatment as in Test 2.
² Average.

Table 4 shows the test on the residual film left after treatment was stopped, and it indicates that the film deposited from 1 P. P. M. was about as protective at the end of one day without treatment as it was while treatment was continuously being supplied. As time was extended beyond one day, the film became less protective. Thus, for best protection, it is recommended that the treatment be fed continuously to keep the metal surfaces saturated to provide the most impervious and continuous film.

While most of the work was done with steel surfaces, sufficient results were obtained with red brass, yellow brass and other metals, to prove that metals generally are also protected by this non-wetting film. It is also true of corroded steel specimens which were tested for film formation. This film formation which is laid on the corrosion deposits is very important industrially as most of the metals in use are in a corroded condition and therefore do not have to be replaced by new metal to make this new type of treatment applicable.

The solubility of the film amines increases with increased acidity of the media, and generally the film is more effective with increased acidity, except where the straight carbon chain reaches the lower molecular weight range.

By substantially mono-molecular film, I mean a film that approaches mono-molecular dimensions.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained and new results accomplished, as it is obvious that the particular instrumentalities herein shown and described are only some of the many that can be employed to attain these objects and accomplish these results.

I claim:

1. The method of protecting the metal contacting surfaces in a continuously flowing system for transporting aqueous media having corrosive qualities which comprises the step of adding to the transporting media an aliphatic compound taken from a group consisting of the high molecular weight amines, amine salts, and amine oxides, having straight carbon chains in which the straight carbon chains contain from 10 to 18 carbon atoms in concentrations of not more than 100 P. P. M., the media having a pH of not more than 8, the amount of compound being sufficient to form on the surfaces of the system a uniform film having the characteristics of being mono-molecular, of being non-wetting and capable of blocking the corrosive action of the media and conveying the media sufficiently to allow the film to form.

2. The method of claim 1, wherein the compound added has the property of blocking the corrosive action of the media within a particular pH range.

3. The method of claim 1, wherein the system has metal surfaces containing large areas of corrosion and the film has the characteristic of forming on the corroded areas blocking further corrosion.

4. The method of claim 1, wherein the compound added is a high molecular weight amine having straight carbon chains from $C_{10}$ to $C_{18}$.

5. The method of claim 1, wherein the compound added is octadecylamine.

6. The method of claim 1, wherein the compound added is hexadecylamine.

7. The method of claim 1, wherein the compound added is dioctadecylamine.

HARRY LEWIS KAHLER.

REFERENCES CITED

The following references are of record in the file of this patent:

UNITED STATES PATENTS

| Number | Name | Date |
|---|---|---|
| 2,007,243 | Downing et al. | July 9, 1935 |
| 2,268,608 | McNulty et al. | Jan. 6, 1942 |
| 2,333,206 | Sloan | Nov. 2, 1943 |
| 2,419,327 | Wachter | Apr. 27, 1947 |